(12) United States Patent
Tolles

(10) Patent No.: US 6,290,589 B1
(45) Date of Patent: Sep. 18, 2001

(54) POLISHING PAD WITH A PARTIAL ADHESIVE COATING

(75) Inventor: Robert D. Tolles, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/207,793

(22) Filed: Dec. 9, 1998

(51) Int. Cl.[7] .................................................. B24D 11/00
(52) U.S. Cl. ........................ 451/526; 451/533; 451/538; 451/539
(58) Field of Search .................... 451/526, 533, 451/538, 539

(56) References Cited

U.S. PATENT DOCUMENTS

| | | | |
|---|---|---|---|
| 3,875,703 | * | 4/1975 | Clemente .............................. 451/538 |
| 3,959,935 | * | 6/1976 | Stoppacher ........................... 451/538 |
| 4,558,542 | * | 12/1985 | Marton ................................. 451/539 |
| 4,767,642 | | 8/1988 | Shimizu et al. ..................... 427/54.1 |
| 4,788,798 | | 12/1988 | DeFranco et al. .................... 51/406 |
| 5,109,638 | * | 5/1992 | Kime, Jr. .............................. 451/539 |
| 5,341,609 | * | 8/1994 | Gorsuch et al. ...................... 451/539 |
| 5,384,988 | * | 1/1995 | Hernandez ............................ 451/538 |
| 5,470,362 | * | 11/1995 | Gorsuch et al. ...................... 451/539 |
| 5,551,136 | | 9/1996 | Bartlett .................................. 29/239 |
| 5,624,304 | * | 4/1997 | Pasch et al. .......................... 451/538 |
| 5,921,853 | * | 7/1999 | Nishio .................................. 451/538 |
| 6,036,579 | * | 3/2000 | Cook et al. .......................... 451/550 |
| 6,036,586 | * | 3/2000 | Ward .................................... 451/538 |

FOREIGN PATENT DOCUMENTS

| | | | |
|---|---|---|---|
| 01-235630 A | 9/1989 | (JP) | ............................. B32B/27/16 |
| 01-275688 | 11/1989 | (JP) . | |

* cited by examiner

Primary Examiner—M. Rachuba
(74) Attorney, Agent, or Firm—Fish & Richardson

(57) ABSTRACT

A method for selectively altering a polishing pad adhesive layer includes providing a mask having transparent regions and opaque regions and directing radiation toward the mask so that the radiation passes through the transparent regions and impinges onto the adhesive layer on the polishing pad. The area of the adhesive layer corresponding to the transparent regions of the mask is cured to be less adhesive. The area of the adhesive layer corresponding to the opaque regions remain adhesive.

23 Claims, 4 Drawing Sheets

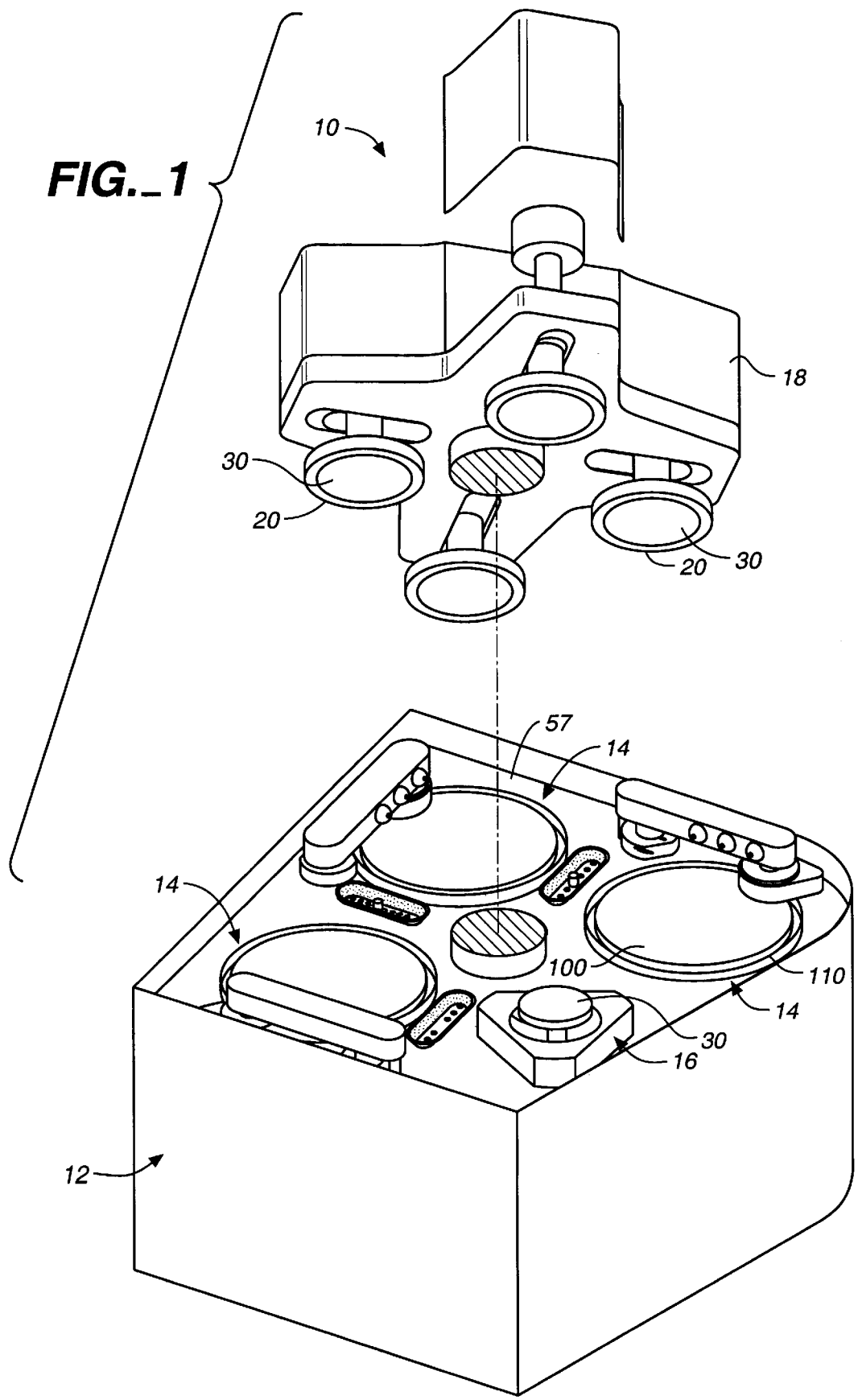

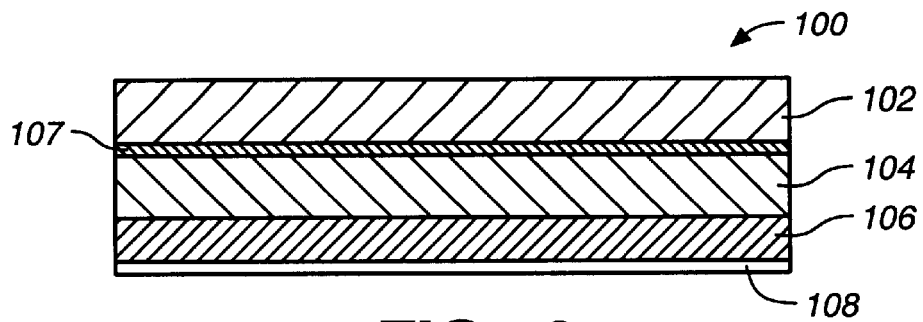
FIG._2
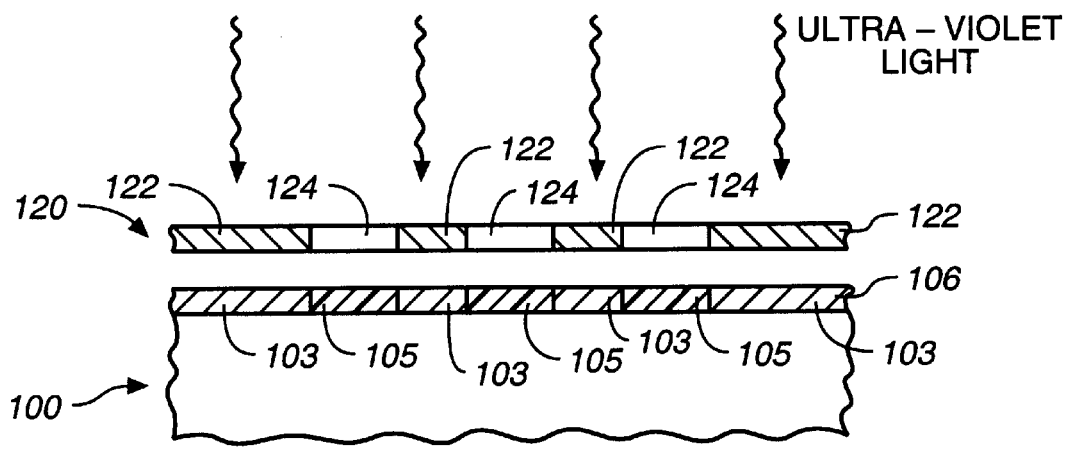
FIG._4
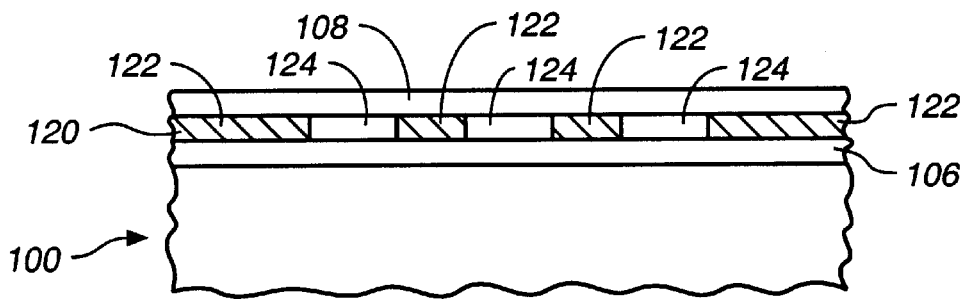
FIG._4A

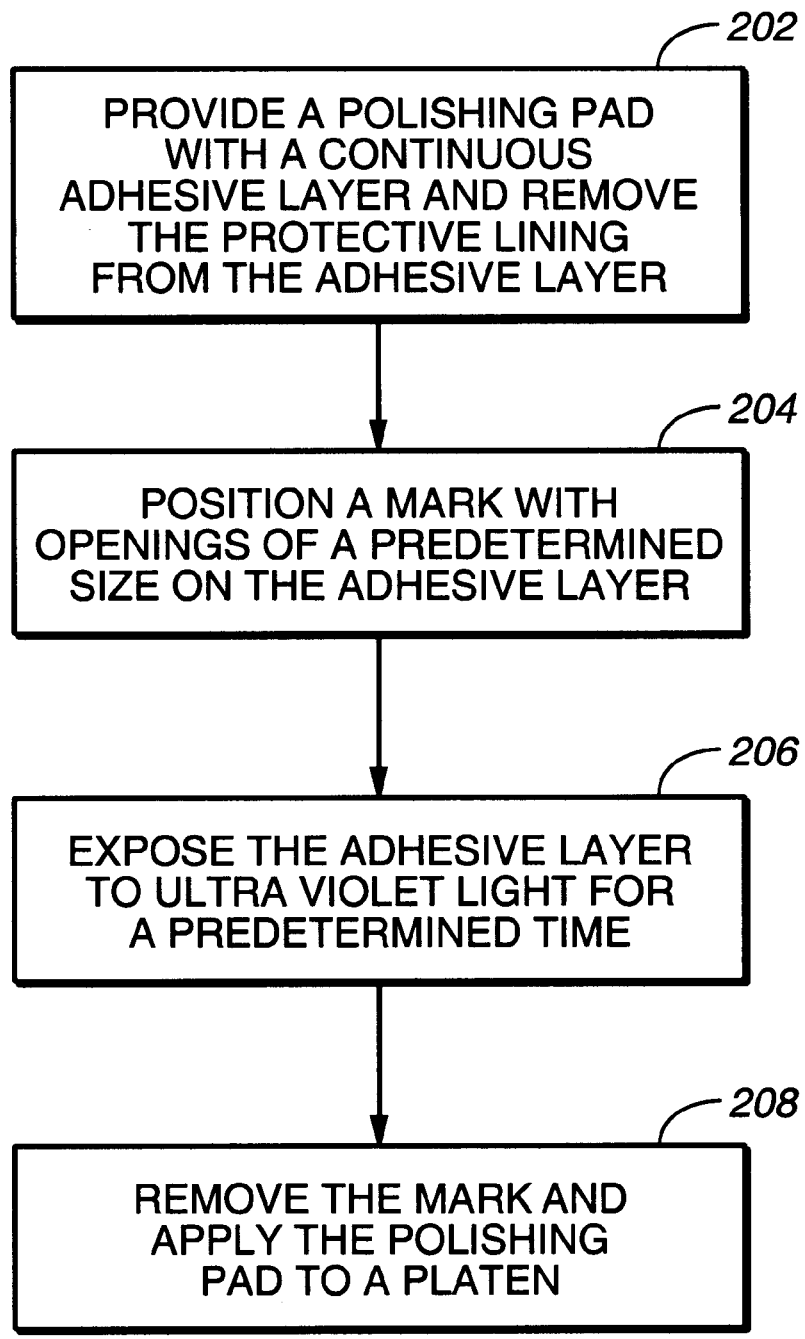
FIG._3

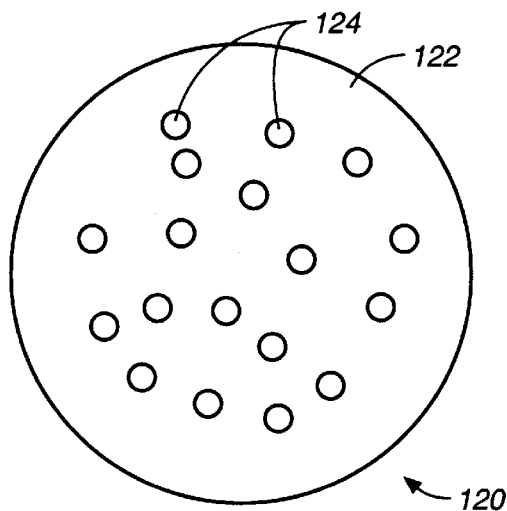
FIG._5
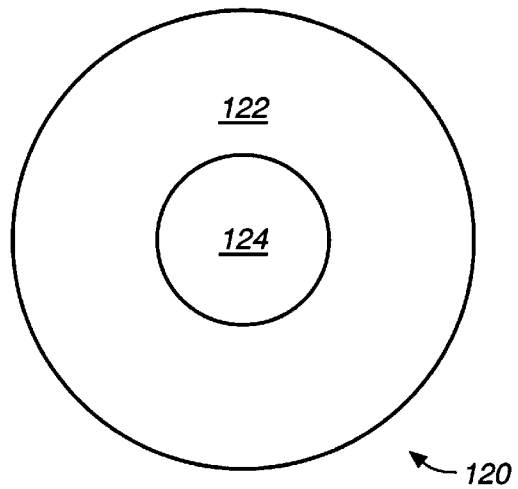
FIG._6
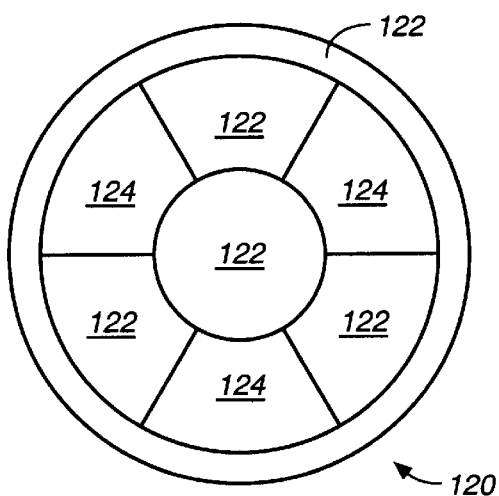
FIG._7
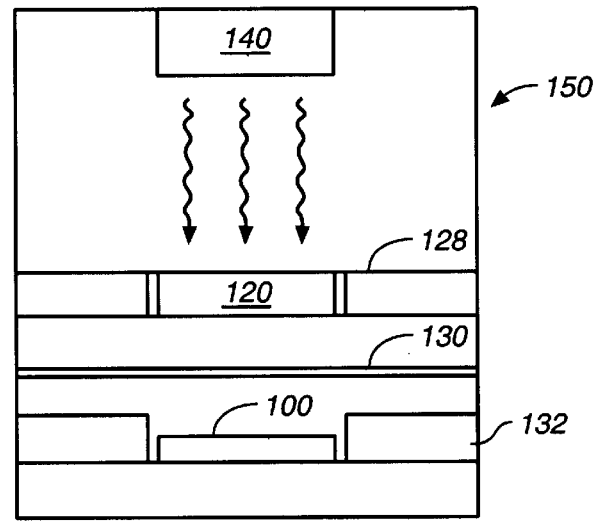
FIG._8

POLISHING PAD WITH A PARTIAL ADHESIVE COATING

BACKGROUND

The invention relates to chemical mechanical polishing of substrates, and more particularly to a polishing pad with a partial adhesive coating, and to methods and apparatus for producing such polishing pads.

Integrated circuits are typically formed on substrates, particularly silicon wafers, by the sequential deposition of conductive, semiconductive or insulative layers. After each layer is deposited, the layer is etched to create circuitry features. As a series of layers are sequentially deposited and etched, the outer or uppermost surface of the substrate, i.e., the exposed surface of the substrate, becomes successively more non-planar. If the outer surface is non-planar, then photolithographic techniques to pattern photoresist layers might not be suitable, as a non-planar surface can prevent proper focusing of the photolithography apparatus. Therefore, there is a need to periodically planarize this substrate surface to provide a planar layer surface.

Chemical mechanical polishing is one accepted method of planarization. This planarization method typically requires that the substrate be mounted on a carrier or polishing head, with the surface of the substrate to be polished exposed. The substrate is then placed against a rotating polishing pad. In addition, the carrier head may rotate to provide additional motion between the substrate and polishing surface. Further, a polishing slurry, including an abrasive and at least one chemically-reactive agent, may be spread on the polishing pad to provide an abrasive chemical solution at the interface between the pad and substrate.

A typical polishing pad includes a hard top layer and a softer bottom layer. The top layer has a high friction polishing surface, capable of transporting slurry, and a second surface adhesively bonded to a first surface of the bottom layer. A second surface of the bottom layer is typically attached to a platen by a high strength pressure-sensitive adhesive layer.

One consideration in the production of integrated circuits is process and product stability. To achieve a low defect rate, each substrate should be polished under similar conditions, i.e., same polishing surface structure. A limitation on process stability, as well as polishing throughput, is "glazing" of the polishing pad. "Glazing" occurs when the polishing pad is frictionally heated and compressed in regions where the substrate is pressed against it, as well as worn as a result of the abrasive contact. The peaks of the polishing pad are pressed and worn down and the pits of the polishing pad are filled up, so the surface of the polishing pad becomes smoother and less abrasive. As a result, the polishing time required to polish a substrate increases. Therefore, the polishing pad surface must be periodically returned to a more uniform abrasive condition, with higher friction and ability to transport slurry. This process is defined as "conditioning" and serves the purpose of maintaining a high polishing rate. The conditioning process can be destructive for the polishing pad and results in reducing the lifetime of the polishing pad. Because of these reasons the polishing pad needs to be removed from the platen and replaced every 100 to 1000 substrates, depending upon the type of substrate and conditioning process.

In order to remove the pad, an operator reaches into the polishing area, grasps the polishing pad by hand or with mechanical aids and pulls it to peel it off the platen. Because of the high strength of the adhesive layer, the operator must apply a large force to pull the polishing pad off the platen. For example, the operator may need to apply pulling force of approximately 100 pounds. This large force can exceed the physical abilities of the operator and can pose a risk of injury.

SUMMARY

In general, in one aspect, the invention features a polishing pad including a first layer having a polishing surface, and a second layer having an adhesive region and a cured region disposed on a surface of the first layer opposite the polishing surface.

Implementations of the invention may include one or more of the following features. The polishing pad may have a plurality of adhesive and cured regions. The cured regions may be partially or entirely cured. The cured regions may be circles or arc segments arranged in a pattern. The cured region and the adhesive region may form concentric circles. A third layer may be disposed between the first and second layers opposite the polishing surface.

In general, in another aspect, the invention features an apparatus for selectively altering a polishing pad adhesive layer. The apparatus includes a radiation source generating a radiation beam, a support for the polishing pad, and a mask having a transparent region and an opaque region. The mask is disposed between the radiation source and the substrate holder, such that the radiation passes through the transparent region and is blocked by the opaque region. A shutter may be disposed between the radiation source and the mask.

In general, in another aspect, the present invention features a method for selectively altering a polishing pad adhesive layer. The method includes: providing a mask having a transparent region and an opaque region and directing radiation toward the mask so that the radiation is blocked by the opaque region and passes through the transparent region to impinge on the adhesive layer on the polishing pad, whereby the area of the adhesive layer corresponding to the transparent region of the mask is cured to be less adhesive.

Implementations of the invention may include one or more of the following features. The radiation may be ultraviolet light. The transparent region may be made of ultraviolet light transparent quartz or polymer material. The mask may be made of ultraviolet light blocking material such as paper metal, ceramic or polymer material. The transparent region may be an opening in the mask. The transparent region and the opaque region may form concentric circles. The mask may have a plurality of transparent and opaque regions. The transparent regions may be circles or arc segments arranged in a pattern. The ratio of the cured region surface to the adhesive region surface may be between about 10 to 30%. The polishing pad may be exposed to the radiation for a time varying between about 5 to 60 seconds. The radiation intensity may vary between about 100 to 1200 Watts/inch.

In general, in another aspect, the invention features a method for selectively altering a polishing pad adhesive layer. The method includes: providing a polishing pad having a layer of adhesive that covers substantially an entire surface of the pad, and curing selected portions of the adhesive layer to reduce adhesive strength of the layer.

Among the advantages of the invention may be one or more of the following. By selectively altering a polishing pad adhesive layer the strength of the adhesive layer is reduced. This reduces the force applied to remove the polishing pad off the platen and the risk of injury for an operator.

Other features and advantages of the invention will be apparent from the following description of the preferred embodiments, and from the claims.

BRIEF DESCRIPTION OF THE DRAWINGS

FIG. 1 is a perspective view of a chemical mechanical polishing apparatus.

FIG. 2 is a diagrammatic cross-sectional view of a polishing pad.

FIG. 3 is a flow diagram describing the method for fabricating a polishing pad with adhesive and non-adhesive regions.

FIG. 4 is a diagrammatic cross-sectional view of a polishing pad being exposed to ultraviolet(UV) radiation through a mask.

FIG. 4A is a diagrammatic cross-sectional view of a polishing pad having a paper mask disposed on the adhesive layer.

FIG. 5 is a top view of a UV mask having a "polka dot" pattern.

FIG. 6 is a top view of a UV mask having a ring pattern.

FIG. 7 is a top view of a UV mask having a ring and arc segment pattern.

FIG. 8 is a diagrammatic view of an apparatus for selectively removing an adhesive layer from a polishing pad.

DETAILED DESCRIPTION

Referring to FIG. 1, a polishing apparatus 10 includes a housing 12 that contains three independently-operated polishing stations 14, a substrate transfer station 16, and a rotatable carousel 18 which choreographs the operation of four independently rotatable carrier heads 20. A more complete description of the polishing apparatus 10 may be found in U.S. Pat. No 5,738,574, the entire disclosure of which is incorporated herein by reference.

Each polishing station 14 includes a rotatable platen 110 which supports a polishing pad 100. The platen 110 is mounted to a table top 57 inside the polishing apparatus 10. In operation, a substrate 30 is loaded to the transfer station 16, from which the substrate is transferred to a carrier head 20. The carousel 18 then transfers the substrate through a series of one or more polishing stations 14 and finally returns the polished substrate to the transfer station 16. Each carrier head 20 receives and holds a substrate, and polishes it by pressing it against the polishing pad 100 on platen 110.

Referring to FIG. 2, one type of a polishing pad 100 includes a fifty mil thick hard layer 102, a fifty mil thick softer layer 104, and a pressure sensitive adhesive lower layer 106. The hard layer 102 is typically a material composed of polyurethane mixed with other fillers. The softer layer 104 is typically a material composed of compressed felt fibers leached with urethane, and adhesive layer 106 is a rubber-based or acrylic based adhesive. The hard layer 102 is adhesively bonded to the softer layer 104 by a bonding layer 107. The thickness of the polishing pad may vary between 30 to 250 mils. A polishing pad, with a hard layer composed of IC-1000, a softer layer composed of SUBA-4, and a layer composed of a rubber-based adhesive, is available from Rodel, Inc., located in Newark, Del. (IC-1000 and SUBA-4 are product names of Rodel, Inc.). The adhesive layer 106 covers the entire bottom area of the polishing pad and has one surface 111 attached to layer 104 and a second surface 109 which is to be attached to the platen. The polishing pad is supplied with this second surface 109 covered with a lining 108, to prevent accidental adhesion of the pad. The lining 108 is removed before installing the polishing pad on the platen.

The force applied to remove the polishing pad from the platen depends upon the size of the area covered with the adhesive and the type of the adhesive. The entire bottom surface of the pad is usually covered with a continuous adhesive layer. The strength of the adhesive layer may be reduced by making selected portions of the adhesive layer less adherent. Specifically, selected areas of the adhesive layer may be partially or entirely cured to reduce their adhesive strength. For example, the selected areas of the adhesive layer may be exposed to ultra-violet (UV) light in the presence of air, as this cures the rubber-based adhesive to make it less adherent.

Referring to FIG. 3, the method 200 of producing a polishing pad with a partial adhesive layer includes providing a polishing pad with a layer of adhesive that covers the entire lower surface of the pad and removing the protective lining that covers the adhesive layer (step 202), positioning a mask with openings of a predetermined size over the adhesive layer (step 204), exposing the adhesive layer to UV light for a predetermined time (step 206), and then removing the mask and applying the pad onto the platen (step 208). After completing the polishing process the pad may be easily peeled away from the platen due to the reduced strength of the adhesive layer.

Referring to FIG. 4, the areas 105 of the adhesive layer 106 that are to be exposed to UV light are selected by using a mask 120. The mask 120 includes windows 124 which are transparent to UV light, and opaque areas 122 which block UV light. The mask material may be paper, metal, polymer or ceramic material, or regular borosilicate glass that blocks UV light. The transparent windows may be openings formed in the mask, UV transparent suprasil type quartz, or certain types of polymer materials which are UV transparent. The areas 105 of the adhesive layer 106 that are exposed to the UV light are cured and the areas 103 that do not receive the UV light remain adhesive. In one example, the mask 120 may be a paper having openings 124 and being attached to the adhesive layer 106 (FIG. 4A). The paper mask may be covered with a lining 108.

Referring to FIG. 5, mask 120 is circular and has a diameter equal to or greater than the diameter of the polishing pad. Different patterns for the UV windows and complementing UV blocking areas are shown in FIGS. 5, 6 and 7. They include transparent "polka dot" windows 124 (FIG. 5) having a diameter between ¼ to ½ inch, a UV blocking ring 122 (FIG. 6) or a narrow outer ring connected to an inner circle by arc segments 122 which alternate with UV windows 124 (FIG. 7). The pattern of transparent and opaque mask areas is replicated in the cured and adhesive areas of the polishing pad, respectively.

The ratio of the surface area of the cured areas 105 to the surface of the adhesive areas 103 determines the strength of the adhesive bond between the polishing pad and the platen. The ratio of the surface of the cured areas to the adhesive areas may vary between about 10% to 30%. Several cured areas, each cured area occupying a small surface, are used to prevent formation of wrinkles on the polishing pad.

The cured areas may be located near the center of the polishing pad to avoid large shear stresses and delamination of the polishing pad from the platen during polishing.

The degree of curing depends upon the exposure time and the intensity of the UV light source. Short exposure times and low UV light intensities cause partial curing, whereas long exposure times and high UV light intensities cause complete curing of the adhesive. Exposure times may vary between 5 to 60 seconds, and UV power levels may vary between 100 to 600 Watts/inch. In one example a UV light of 100 Watts/inch is used and the exposure time may vary between 5 to 30 seconds for a rubber based adhesive.

Referring to FIG. 8, an apparatus 150 for selectively curing an adhesive layer includes a UV source 140, a mask 120 supported by a mask holder 128, a shutter 130 for blocking the UV-light to the polishing pad 100 and a support or holder 132 supporting the polishing pad. The UV source has a fast linear ramp-up and ramp-down mechanism, and variable intensity high enough to fully cover the polishing pad surface and low enough to avoid build up of heat in the pad. In one example, the UV source 140 is a UV lamp from UV Systems, Gaithersburg, Md. having an intensity that can be linearly ramped-up to 600 Watts/inch. In other examples, a UV source having a 20 inch long bulb and being rated at 1200 Watts/inch is used to irradiate a circular polishing pad along its diameter.

One embodiment of the present invention has been described. Nevertheless, it will be understood that various modifications may be made without departing from the spirit and scope of the invention.

Accordingly, other embodiments are within the scope of the following claims.

What is claimed is:

1. A polishing pad comprising:
    a first layer having a polishing surface; and
    a second layer having a surface disposed opposite the polishing surface, the surface of the second layer having an adhesive region and a cured region.
2. The polishing pad of claim 1 wherein the surface of the second layer includes a plurality of adhesive and cured regions.
3. The polishing pad of claim 2 wherein the cured regions are circles.
4. The polishing pad of claim 2 wherein the cured regions are arc segments.
5. The polishing pad of claim 1 wherein the cured region and the adhesive region form concentric circles.
6. The polishing pad of claim 1 wherein a ratio of a surface area of the cured region to a surface area of the adhesive region is between about 10% to 30%.
7. The polishing pad of claim 1 further including a third layer disposed between the first and second layers.
8. The polishing pad of claim 1 wherein the cured region is partially cured.
9. The polishing pad of claim 1 wherein the cured region is entirely cured.
10. A polishing pad comprising:
    an article having a first polishing surface and a second surface disposed opposite the first surface, the second surface having a first adhesive region and a second cured region that is less adhesive than the first region.
11. A polishing pad comprising:
    a polishing layer having a polishing surface; and
    an adhesive layer on a side of the polishing layer opposite the polishing surface, the adhesive layer including a first portion and a second portion that is cured more than the first portion so that the second portion is less adhesive than the first portion.
12. An article comprising:
    a polishing pad having a polishing surface; and
    a layer disposed on a surface of the polishing pad opposite the polishing surface, the layer including a first portion and a second portion that is cured more than the first portion so that the second portion is less adhesive than the first portion.
13. The article of claim 12 further comprising a removable liner disposed on a side of the layer opposite the polishing surface.
14. A chemical mechanical polishing apparatus comprising:
    a rotatable platen;
    a polishing pad having a polishing surface;
    a layer securing the polishing pad to the platen, the layer including a first adhesive portion and a second portion that is cured more than the first portion so that the second portion is less adhesive than the first portion;
    a carrier head to hold a substrate against the polishing pad; and
    a source of polishing fluid to supply polishing fluid to the surface of the polishing pad.
15. The apparatus of claim 14 wherein the layer includes a plurality of adhesive and cured portions.
16. The apparatus of claim 15 wherein the cured portions are circles.
17. The apparatus of claim 15 wherein the cured portions are arc segments.
18. The apparatus of claim 14 wherein the cured portion and the adhesive portion form concentric circles.
19. The apparatus of claim 14 wherein a ratio of a surface area of the cured portion to a surface area of the adhesive portion is between about 10% to 30%.
20. The apparatus of claim 14 wherein the polishing pad includes a rigid upper section with a polishing surface and a soft lower section adjacent the layer.
21. The apparatus of claim 14 wherein the cured portion is partially cured.
22. The apparatus of claim 14 wherein the cured portion is entirely cured.
23. The polishing pad of claim 1 further comprising a removable liner on a side of the second layer opposite the polishing surface.

* * * * *